Patented Oct. 2, 1928.

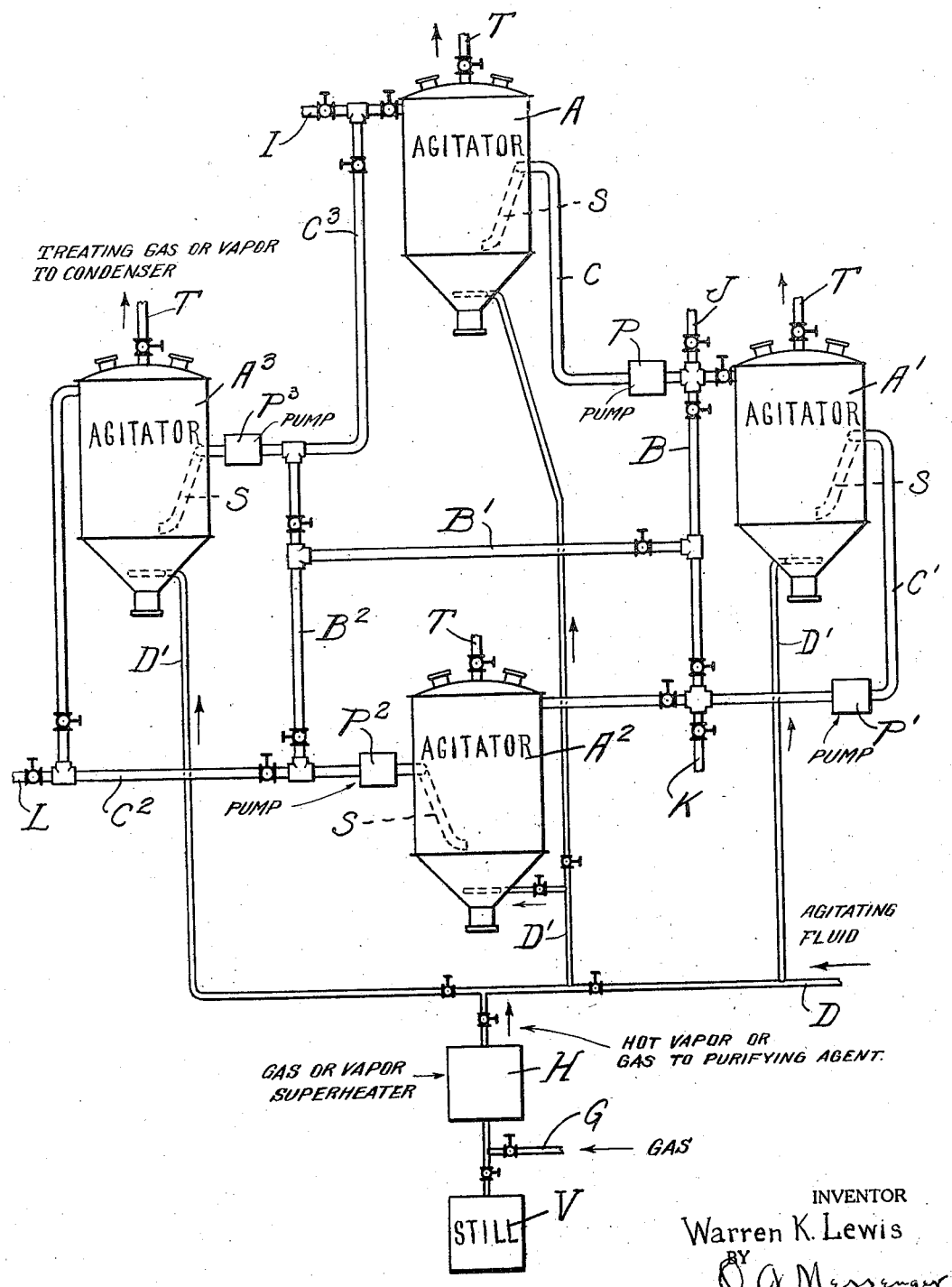

UNITED STATES PATENT OFFICE.

1,686,493

WARREN K. LEWIS, OF NEWTON, MASSACHUSETTS, ASSIGNOR TO STANDARD OIL DEVELOPMENT COMPANY, A CORPORATION OF DELAWARE.

REFINING OILS, ETC.

Application filed August 23, 1923. Serial No. 658,878.

This invention relates to the art of refining oils and the like, and will be fully understood from the following description, taken in connection with the accompanying drawing, which illustrates diagrammatically a form of apparatus in side elevation for carrying out the invention.

In the customary process of filtering oils, much time is consumed by reason of slow passage through the filters, and if channeling in the filter bed occurs corresponding portions of the oil go through without proper contact with the fuller's earth and further extra filtration becomes necessary. A more expeditious and efficient procedure is correspondingly much desired.

In accordance with the present invention, an oil to be purified is charged into a receptacle and is agitated with fuller's earth or the like. After thorough agitation to bring all portions well in contact, the agitation is stopped and the clay is allowed to settle to the bottom. The oil is then drawn off by decantation, as for example by varied level outlets or by a suitable swing pipe and a pump, and is forwarded to another receptacle where it is again agitated with another charge of fuller's earth. After agitation, the clay is allowed to settle down, and the oil is drawn off as before, and is forwarded to another receptacle where it is again agitated with another charge of fuller's earth. After agitation, the clay is allowed to settle down, and the oil is drawn off. As many such treatments with fuller's earth may be carried out in succession as are desired, and while I have shown four agitating receptacles for illustration it will be understood that as many may be provided as preferred. The fuller's earth remaining in the receptacle can be used further, until it becomes so loaded with coloring matters and impurities as to be without practical effect; and accordingly for such further use charges of oil may be introduced and agitated with the clay and be drawn off successively. The entire series of agitating receptacles will advantageously be operated in a progressive cycle, the oil to be purified being started in one of the receptacles and passing in succession through the rest of the series. When the clay in the first receptacle after use on repeated charges of oil is "spent" or no longer adequately efficient, it is freed from soakage oil and dumped and the receptacle is provided with a fresh charge of clay. While this receptacle is thus out of use the oil is meantime starting into the series at the next receptacle, and so on, a sufficient number of receptacle being provided in the battery to allow of cleaning and recharging each unit in succession while the oil is being treated with the clay in the others in series. The cleaning and recharging turn for each unit in the series thus works around progressively in the series. When a unit is off for cleaning and recharging with clay, the oil flow is simply by-passed around such unit by a by-pass connection.

Agitation may be effected by mechanical stirrers, or by jets of air or recirculated still gas or other inert gas introduced by a perforated pipe in the bottom of the agitating receptacle.

In preparing to dump a batch of oil-soaked clay, the clay is washed and agitated with naphtha one or more times, the naphtha being drawn off to a still or tank. The clay is then dried. This may be done by applying heat at the bottom of the receptacle by a steam jacket or coil, or very hot naphtha vapor or steam or hot gas may be blown through the clay. In using the hot vapor or the hot gas, it may readily be determined when the clay is sufficiently dried by noting when the temperature at the top of the receptacle becomes about the same as that at the bottom. After drying, the clay may be run out of the receptacle like sand, on removing the bottom man-head. The clay may then be revivified by any of the known methods if desired and be put back into use.

In the drawing the agitating receptacles A, $A^1$, $A^2$, $A^3$, are shown as provided with connecting pipes C, $C^1$, $C^2$, $C^3$ and pumps P, $P^1$, $P^2$ and $P^3$. By-pass pipes B, $B^1$, $B^2$ are provided, in order to allow by-passing the respective units as desired, control valves being located at each lead. Swing pipes S operated by floats or mechanical means as may be preferred are located in the receptacles in connection with the outlet pipes. For introducing agitating fluid blasts the pipe D leading from a suitable source of supply is arranged with branches $D^1$ connecting into a perforated bottom pipe in each agitator. A still V connects with a vapor super-heater H and in turn with the pipe system D to allow introduction of hot naphtha vapors into any agitator desired, and a connection G allows the introduction of a gas through the heater H and thence to any agitator desired.

Naphtha vapors or gas containing naphtha vapors escaping from the receptacles by the top pipes T may be passed through any suitable condenser or absorber system not shown, and the gas may be used again by returning it to the inlet pipe system leading to the base of the agitators.

At I, J, K and L oil inlet and outlet connection points for the system are provided, enabling feed and discharge as desired.

While I have more particularly referred to petroleum, it will be understood that other oils, fats, etc., may be likewise cyclically treated; and instead of fuller's earth, other adsorbent agents, as prepared silicates, charcoals etc. may be employed.

What I claim is:

1. The improvement in the art of purifying oils and the like, which comprises passing the oil through units in each of which the oil is agitated with a charge of filtering clay and settled and decanted, and serially by-passing each unit in turn when its clay becomes inefficient and washing the said inefficient clay with naptha while in the unit, drying the clay by flowing hot gaseous fluid therethrough while in the unit, dumping the clay, replacing with fresh clay, and restoring the unit back in the treating cycle in turn.

2. In a process of purifying oils and the like, the operating cycle which comprises agitating the oil with an adsorbent agent in a receptacle, settling and decanting, repeating the agitation with a further charge of adsorbent agent, settling and decanting, and serially in turn after the said adsorbent agent has become inefficient washing the charges of adsorbent agent while in the receptacle with naptha and drying the adsorbent agent while in the receptacle by blowing hot gaseous fluid therethrough, and substituting a fresh charge of adsorbent agent.

3. In a process of purifying oils and the like, the operating cycle which comprises agitating the oil with an adsorbent agent in a receptacle, settling and decanting, repeating the agitation with a further charge of adsorbent agent, settling and decanting, and serially in turn washing and drying the adsorbent agent while in the agitating receptacle and replacing it with a fresh charge of adsorbent agent.

4. In a process of purifying oils and the like continuously, the steps of agitating the oil with an adsorbent material in a succession of units, passing the oil successively from one unit to another, agitating the oil in each such unit with a charge of adsorbent material, removing the oil from the absorbent material washing the adsorbent material with naphtha after removing the oil therefrom, drying said adsorbent material by blowing hot gaseous fluid therethrough in the unit where used, and supply fresh adsorbent material to replace said spent washed and dried material.

WARREN K. LEWIS.